Patented June 27, 1950

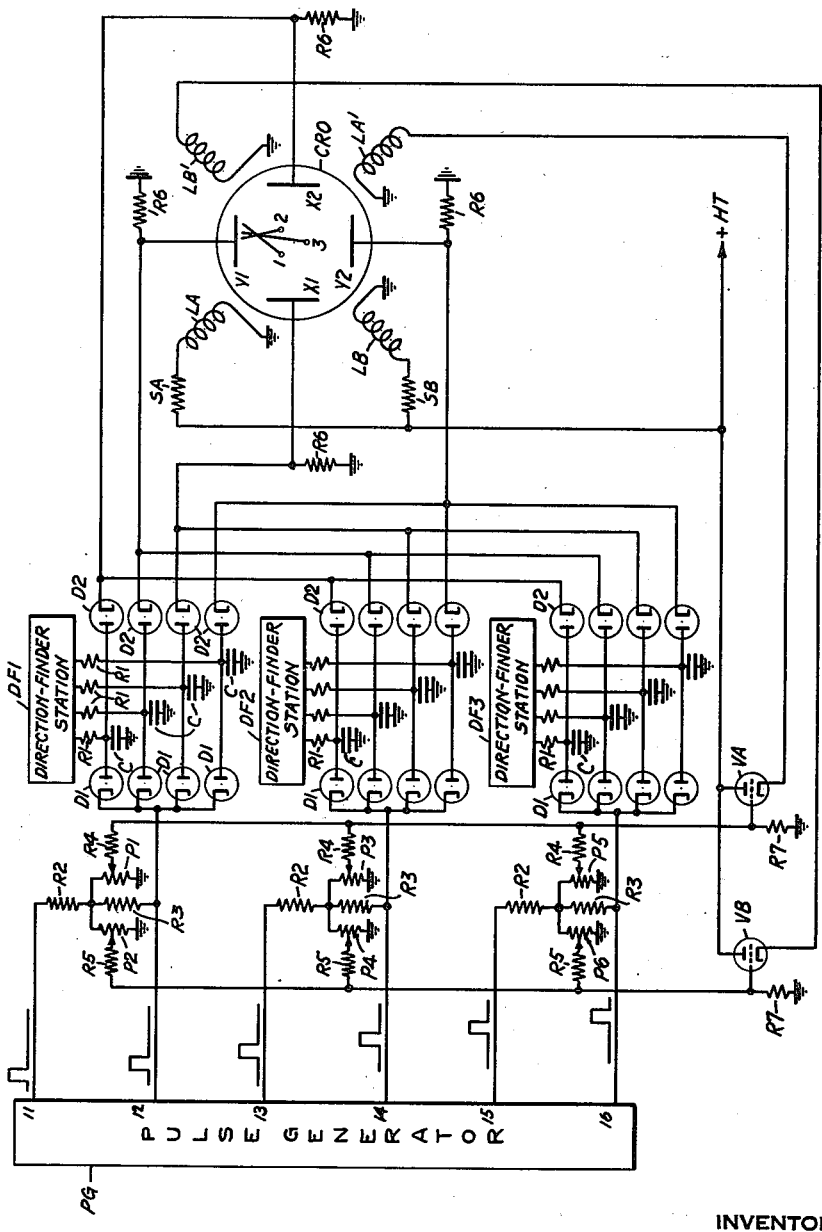

2,512,615

UNITED STATES PATENT OFFICE 2,512,615

RADIO-POSITION INDICATING SYSTEM

Charles William Earp and Ronald Montague Godfrey, London, England, assignors to International Standard Electric Corporation, New York, N. Y.

Application August 30, 1947, Serial No. 771,440
In Great Britain October 17, 1946

12 Claims. (Cl. 343—112)

This invention relates to radio plan-position indicating systems. More particularly, it releates to plan-position indicating systems of the type wherein the position to be indicated on the plan is obtained by triangulation of bearings observed at a plurality of geographically separated radio direction-finder stations.

The practice of obtaining the position of a mobile transmitting station by observing the bearing of the station relative to each of a plurality of fixed direction-finder stations, and then obtaining a "fix" by the manual process of drawing on a map the observed bearing lines from the respective observing stations and extending the lines to find the point of intersection, has long been in use in connection with aircraft navigation. Of recent years the increasing speed of aircraft has rendered it necessary to reduce to a minimum the time required for carrying out this process, if the resultant information is to be of real value. This has led to the adoption of automatic direction-finding systems whereby the time occupied in taking the bearings has been reduced, and further time-saving has been achieved by transmitting to the "mapping" centre the bearing information in the form of tone signals automatically transmitted over telephone lines by the direction-finding systems, as part of their normal functioning. So far as the applicants are aware, however, no satisfactory method has so far been proposed for reducing the time required to perform the final triangulation of bearings to determine the actual position of the aircraft.

It is therefore a main object of the present invention to provide a radio plan-position indicating system, of the type in which the position is obtained by triangulation of the bearings of the observed mobile station relative to a plurality of fixed geographically separated automatic direction-finder stations, which automatically displays the required position synchronously with the determination of the bearings by the direction-finder stations, thereby avoiding the loss of time inherent in manual operation.

According to the invention there is provided a radio plan-position indicator system for indicating the position of a mobile transmitting station, said system comprising a cathode-ray oscillograph and means for successively and cyclically displaying on the screen of said oscillograph, at a display-frequency sufficiently high to ensure a substantially persistent visual image, traces corresponding to each in turn of a plurality of fixed geographically separated automatic direction-finder stations, the origin of each trace being determined by the position of the corresponding direction-finder station, and the direction of each trace being determined by the bearing of said mobile station observed at the said corresponding direction-finder station, whereby the position of said mobile-station is indicated on said screen by the point of intersection of said persistent traces.

More specifically, the invention provides a radio plan-position indicator system comprising a cathode ray oscillograph having a screen and first and second sets of means for deflecting the beam of the oscillograph, means for driving from each of a plurality of fixed geographically separated automatic direction-finder stations a set of bearing voltages corresponding to components of the observed bearing of a mobile transmitting station relative to the said direction-finder station, means corresponding to each said direction-finder station for generating a set of D. C. position-voltages corresponding to components of the position of said direction-finder station, commutative means for controlling the energisation of said sets of beam-deflecting means in each of a plurality of successive and cyclically repeated regimes corresponding to respective ones of said plurality of direction-finder stations, the frequency of commutation being sufficiently high to ensure a substantially persistent visual image on said screen, and in each regime the said set of bearing voltages and said set of position voltages associated with the corresponding direction-finder station being applied to energise said first set and said second set of beam-deflecting means respectively, the period of application of said set of bearing-voltages being included in and not exceeding the period of application of said set of position-voltages, whereby there is displayed on said screen a plurality of traces originated by respective ones of said plurality of direction-finder stations, the point of intersection of said traces indicating the position of said mobile station.

Other features of the invention will become apparent in the following description of a preferred embodiment of the invention which is illustrated schematically in the single figure of the accompanying drawing.

Referring to the drawing, this illustrates an indicating system according to the invention adapted for operation from three direction-finder stations, each of which transmits to the location of the indicating system voltages representative of, for example, the north-south and east-west components of the bearing of the mobile transmitter relative to the said direction-finder station, from which are derived corresponding voltages for application to the oscillograph of the equipment. The direction-finder station may be of any automatic type capable of displaying the bearing as a linear trace on the screen of a cathode ray oscillograph, and the transmitted voltages may conveniently be those which would normally be applied to the oscillograph of the direction-finder station. Since the indicating system as a whole operates on the triangulation principle, the presence of 180° ambiguity does not introduce any error, and quite simple direction-finders of types which have long been known in the art may therefore be used in the present invention. It is however desirable to avoid this ambiguity, as it produces on the screen unnecessarily long traces which merely confuse the display without furnishing additional information. It is therefore preferred that the direction-finder stations be of a type which is devoid of 180° ambiguity. One preferred arrangement, based on that disclosed in the specification of British Patent No. 490,940, may be described briefly as follows.

The receiving antenna system is of the Adcock pattern, comprising four dipoles located at the corners of a square, the diagonally opposed pairs of dipoles being cross-connected, the two pairs thus formed giving signal voltages proportional respectively to sin $a$ and cos $a$, where $a$ is the azimuth angle made by the bearing of the signal source relative to one of the pairs. An additional dipole centrally located in the square provides a signal voltage the amplitude of which is independent of the direction of the signal source.

The output signals from the dipole pairs are converted by means of balanced modulators and low frequency oscillators to sidebands of the original carrier frequency. The signal from what is for convenience termed the east-west pair of dipoles is modulated with tone of 5 kc./s. frequency; the balanced modulator suppresses the carrier, but leaves the upper and lower sidebands resulting from the said modulation; these sidebands are proportional in amplitude and also in phase, to the signal delivered by the dipole pair to the modulator. In the manner the signal from the second or north-south pair of dipoles is modulated with tone of 6 kc./s. frequency to produce sidebands proportional in amplitude and phase to the signal delivered by the corresponding dipole pair. The sidebands so produced by the two dipole pairs are then fed, together with the signal derived from the central dipole, to a common amplifier and detector system, at the output terminals of which are obtained two tones, one of 5 kc./s. obtained as a detection product from the centre dipole signal and the 5 kc./s. sidebands corresponding to the east-west dipole pair, and one of 6 kc./s. similarly obtained from the centre dipole signal, and the 6 kc./s. sidebands corresponding to the north-south dipole pair. The centre dipole as such is also demodulated, so that the output terminals of the common amplifier and detector system yield, in addition to the two tones mentioned above, any speech modulation which may be present in the received signal. This speech modulation is isolated, by means of a filter passing a band of say 250 C. P. S. to 3000 C. P. S., and passed to a message-handling position. The derived 5 kc./s. and 6 kc./s. tones are also selected by filters, and are then fed separately each to a differential detector of known character. In one of these differential detectors the 5 kc./s. derived signal is beaten against a 5 kc./s. tone taken directly from the east-west modulation oscillator, to yield a unidirectional output voltage the magnitude and sense of which varies with the magnitude and phase of the derived 5 kc./s. tone i. e. with the magnitude and phase of the signal delivered by the east-west pair of dipoles. Similarly, in the other differential detector the derived 6 kc./s. tone is beaten against a 6 kc./s. tone taken directly from the north-south modulation oscillator to yield another unidirectional output voltage the magnitude and sense of which varies with the magnitude and phase of the derived 6 kc./s. tone i. e. with the magnitude and phase of the signal delivered by the north-south pair of dipoles. These two unidirectional voltages can be applied directly to the X and Y deflecting plates of a cathode ray oscillograph in which case the beam spot is steadily deflected from its normal position in a direction determined, without ambiguity, by the direction from which the signals were received.

It is to be noted that while the voltages derived from the direction-finder for use in the present indicator system are unidirectional voltages, it is not essential that they be transmitted from the direction-finder station to the location of the indicator system in this form. For example, if the direction-finder station is of the preferred type described above, the 5 kc./s. and 6 kc./s. tones which would normally be applied to differential detectors at the direction-finder station itself may also be transmitted to the indicator station, for application to differential detectors there located, by any transmission system capable of dealing with such frequencies. If the transmission system is restricted in frequency range to say 3 kc./s., as for example in a telephone circuit, frequency-changing means may be used to enable the tones to be transmitted at say 1.5 kc./s. and 2.5 kc./s., and the differential detectors arranged to operate at these frequencies instead of at the original frequencies of 5 kc./s. and 6 kc./s.

It should also be noted that while the direction-finder station transmits to the location of the indicator only two voltages, these two voltages involve four terminals each having its own potential to ground, and beam-deflecting means may therefore be operated from each of the four terminals independently. Moreover, in the present embodiment a common positive bias (not shown on the drawing) with respect to ground is superimposed on the derived voltage at each terminal to render possible the use of diode switching as hereinafter explained.

Referring again to the drawing, CRO denotes a cathode ray oscillograph provided with a set of electrostatic beam deflecting plates X1, X2 and Y1, Y2, and also with a set of magnetic beam deflecting coils LA, LA' and LB, LB'. Other parts of the oscillograph are not shown, since they follow standard practice and call for no special comment. Each of the electrostatic deflecting plates is provided with the usual high resistance leak to ground, denoted by R6, and one end of each of the deflecting coils is connected to ground. The deflecting plates are arranged in pairs in mutually perpendicular planes in the usual manner. The magnetic deflecting coils are likewise arranged in pairs, the coils of a pair such as LA and LA' being mounted on a common axis, on opposite sides of the oscillograph tube in such manner that the magnetic flux traverses the tube at right angles to the direction of the beam, and the axis of the pair LA, LA' being perpendicular to the axis of the pair LB, LB'.

The blocks DF1, DF2, and DF3 indicate the terminal blocks on which appear the four positively biassed deflecting-plate voltages derived directly or indirectly from the respective direction-finder stations. Associated with each terminal is a resistance R1 through which the voltage charges a condenser C, a diode D2 through which the voltage across condenser C is applied to the appropriate deflector plate of the oscillograph, and a diode D1 which is commutatively controlled by pulses from pulse generator PG and which removes the voltage from condenser C except when the latter is required to apply voltage to a deflector plate.

The pulse generator indicated generally by block PG is a six-phase square wave generator which supplies successively and cyclically to its six output terminals t1, t2 ... t6 unidirectional pulses of duration approximately 1/120 second and repetition period 1/20 second, each cycle of operations being completed in 1/20 second.

The duration of the pulse should be substantially equal to the repetition period divided by the total number of phases, but otherwise is not critical; the pulse repetition frequency should be sufficiently high to avoid "flicker" in the picture displayed on the oscillograph screen, but otherwise is not critical. Generators suitable for the present purpose are already known, for example in connection with multiplex communication systems in which the various channels operate on a time-sharing basis. By way of example, one may be of the character wherein the phased pulses are derived from a train of two-condition devices such as multivibrators which are each switched over by pulses derived from the preceding device, and are switched back by a train of separately generated terminating pulses.

Of the six phased pulses originated in PG per complete cycle of operations, alternate pulses are used to control the diodes D1 so that the sets of voltages from the three direction finder stations are applied to the set of electrostatic deflecting plates in succession, each direction finder being operative for 1/120 second (8.3 milliseconds), with an idle or no deflection period of 1/120 second between successive application. In addition, immediately successive pulses are combined in pairs through resistances to give pulse voltages of duration 1/60 second which are fed through potentiometers to cathode-follower valves VA and VB, the outputs of which energise the magnetic deflecting coils to give the beam a mean deviation corresponding to the position of each direction finder in turn while the voltages from that direction finder are operative, and also for the period 1/120 second immediately preceding the operative period, thus giving a bright spot-indication on the oscillograph screen corresponding to the position of the station. The relative timing of the phased pulses from PG is indicated on the drawing.

A more detailed explanation of how the system of the present embodiment is operated will now be given. Referring to the drawing, it will be seen that (considering DF1) each of the four D. C. voltages is led to the junction of the anodes of a pair of diodes (e. g. D1, D2) via a high resistance R1, the junction being shunted to ground by a capacity C. The cathode of D2 is connected to the X1 deflection plate of a cathode ray tube, and the cathode D1 is connected to the phase t2 output of the six phase positive pulse generator. Normally D1 short circuits the positive X1 deflection voltage from DF1 to earth and thus no voltage from this source reaches the cathode ray tube. When however the phase t2 positive pulse occurs the cathode of D1 is raised from earth potential by the voltage amplitude of the pulse (some 200–300 volts) and thus D1 becomes non-conducting and the X1 deflection voltage begins to charge the capacity C positively at a rate dependent on the product CR1. The voltage across C is transferred through D2 to the deflecting plate X1 for which the usual high resistance leak R6 is provided.

At the same time and in a similar manner the remainder (Y1, X2, Y2) of the deflecting voltages from DF1 are fed to the cathode ray tube. The effect thus is that (if all the charging time constants R1C are equal) a radial line is traced out on the face of the cathode ray tube whose origin is the centre of the tube and whose length is dependent on the voltages applied and the relationship between the switching pulse width and the charging time constants of the capacities. At the end of the pulse the cathodes of D1 etc., return quickly to earth potential thereby discharging the capacities C and causing the immediate fly back of the trace to the origin.

During the next period when the pulse of the phase t3 output of the generator occurs the beam of the cathode ray tube remains undeflected, but during the pulse of phase t4 the deflection voltages from DF2 become connected and disconnected to the cathode ray tube in a similar manner to those from DF1 during the pulse of phase t2. For the next period the beam is again undeflected but for the sixth period the beam deflects in accordance with the voltages from DF3 whilst for the next, or first, period of the new switching cycle it is again undeflected, and from this point the whole cycle of operations is repeated. It will be seen that the diodes D2 prevent interaction between the voltages from the three sources which are connected in order to the plates of the cathode ray tube.

The overall effect seen on the face of the tube due to these commutating operations is a trace consisting of a bright central point from which three equal radial lines originate, that is, a means has been established for displaying the bearings from three direction finders on one cathode ray tube. It will be seen that if it is possible to shift the origins of the three lines forming the trace so that they conform to the special arrangements of the three direction finders from which they are separately derived, then the lines will meet in a point which gives the position of the transmitter with respect to the configuration of the three stations. The way in which this result is achieved is to deflect the beam of the cathode ray tube electromagnetically in the direction corresponding to the position of a direction finder during the period for which the voltages from that finder are being applied to the tube, and for the period immediately preceding during which no deflection occurs. (This latter operation is to establish a bright point on the face of the tube corresponding to the position of each finder.)

The outputs of phases t1 and t2 of the pulse generator are mixed via high series resistances R2 and R3 and fed to the tops of the two high resistance potentiometer P1 and P2 connected in parallel. The high resistances R2 and R3 are required only for decoupling between the phases, and may if desired be replaced by rectifiers poled to pass only the output pulse from the associated phase. The slider of each potentiometer is connected via another high resistance to the grid of a cathode follower VA, VB, the leak of which is of lower value. Each cathode follower is connected to earth via a deflecting coil on the neck of the cathode ray tube (L'A, L'B). The axes of the two coils are arranged to be mutually perpendicular with the axis of the tube. A pair of coils LA and LB placed coaxially with respect to the corresponding cathode coils are connected between earth and the high tension supply in series with resistances to control the currents through the coils, which are such that the field set up within the tube is sufficient to deflect the electron beam a little further along each axis that will ever be necessary for shifting the origin. During the time when the pulses of the generator outputs of phases 11 and 12 occur currents will flow through the coils LA' and L'B which will correspond to the settings of P1 and P2. These two controls are adjusted so that the magnetic fields set up by the coils are such that they reduce, cancel or replace in the opposite direction, the initial deflections of the beam to such an extent that the origin is shifted by the amount required for the correct spatial representation of the position of DF1.

The outputs of phases 13 and 14 (for DF2) and of phases 15 and 16 (for DF3) are similarly combined and fed to the same pair of cathode followers VA and VB. By means of the separate controls the coil currents are adjusted in each case so that the origin shift is correct.

The effect produced on the screen of the cathode ray tube is shown in the drawing from which it will be seen that with a knowledge of the scale on which the "map" is constructed the position T of the transmitter is determined.

In practice a grid reference system or a map of the terrain or both would be etched on the screen or otherwise applied thereto, for example by optical projection, and the position read directly.

The scale of the map would be such that the area covered by the face of the tube is the service area of the direction finding system as a whole.

While particular types of apparatus and circuits have been referred to in the foregoing description of one particular embodiment of the invention, it will be understood that many variants obvious to those skilled in the art may be employed without departing from the scope of the invention. For example, any of all of the diode rectifiers may be replaced by selenium or copper-oxide or other types of rectifier. The positive polarisation of the bearing voltages may be replaced by negative polarisation provided that the polarity of the rectifiers be correspondingly reversed.

The cathode-follower amplifiers VA and VB may be replaced by other forms of direct current amplifiers, for example amplifiers such as are used in direct current telegraph systems, and in certain cases it may be unnecessary to use any amplifiers at all. The number of phases may be modified according to the accentuation it is desired to give to the appearance on the trace of the luminous spot marking its origin; for example, there may be three phases per direction-finder station, all three being used to control the application of the position-voltages and only one of the three to control the application of the bearing voltages, whereby the origin of the trace will be strongly marked; or again, there may be only phase per direction finder station, in which case the origin of the trace will not be accentuated.

It is also to be understood that the location of the indicator itself, or of any reference points that may be desired, may be shown on the indicator by treating the said location as that of a direction-finder station; for a location there will of course be no bearing-voltages to generate a trace, and the location will be indicated simply by the luminous spot on the screen consequent on the application of the appropriate position-voltages during the corresponding regime.

While in the embodiment described and illustrated with reference to the accompanying drawing the first and second sets of beam deflecting means are respectively electrostatically and magnetically deflecting devices, the invention is not restricted to this arrangement, and either type of deflection means may be used for either set. Moreover, relay switching may be used instead of rectifier switching, the relays for each regime being operated by corresponding phases of a poly-phase generator, which is not necessarily a pulse generator, or by mechanical commutating means such as a rotating switch completing the relay circuits for each regime in cyclical succession. With such an arrangement the periods of energisation of the deflecting means would be governed by the time constants of the relay circuits and the mechanical design of the relays according to factors well known in telephone and telegraph relay practice.

What is claimed is:

1. A radio plan-position indicator system comprising a cathode ray oscillograph having a screen and first and second sets of means for deflecting the beam of the oscillograph, means for deriving from each of a plurality of fixed geographically separated automatic direction-finder stations a set of bearing voltages corresponding to coordinate components of the observed bearing of a mobile transmitting station relative to the said direction-finder station, means corresponding to each said direction-finder station for generating a set of D. C. position-voltages corresponding to components of the position of said direction-finder station, commutative means for controlling the energisation of said sets of beam-deflecting means in each of a plurality of successive and cyclically repeated periods corresponding to respective ones of said plurality of direction-finder stations, the frequency of commutation being sufficiently high to ensure a substantially persistent visual image on said screen, and in each period the said set of bearing voltages and said set of position voltages associated with the corresponding direction-finder station being applied to energise said first set and said second set of beam-deflecting means respectively, the period of application of said set of bearing-voltages being included in and not exceeding the period of application of said set of position-voltages, whereby there is displayed on said screen a plurality of traces originated by respective ones of said plurality of direction-finder stations, the point of intersection of said traces indicating the position of said mobile station.

2. A radio plan-position indicator system according to claim 1 in which the said period of application of said set of bearing-voltages is less than said period of application of said position voltages, whereby the origin of each said trace is marked by a luminous spot on the trace, the positions of said spots indicating on the screen the positions of the direction-finder stations which originate the respective traces.

3. A radio plan-position indicator system according to claim 2 in which the said period of application of said set of bearing-voltages is one half the said period of application of said position-voltages.

4. A radio plan-position indicator system according to claim 1, in which at least one of said sets of beam-deflecting means comprises means to deflect the beam by electrostatic action.

5. A radio plan-position indicator system according to claim 1, in which at least one of said sets of beam-deflecting means comprises means to deflect the beam by magnetic action.

6. A radio plan-position indicator system according to claim 1, in which said commutative means comprises an equi-phase voltage generator system, the phases of which correspond to respective ones of said plurality of periods, and means responsive to the output of each said phase to control during the corresponding regime the energising application of said set of bearing voltages to said first set of beam deflecting means and of said set of position-voltages to said second set of beam deflecting means for respective periods of predetermined durations.

7. A radio plan-position indicator system according to claim 6, wherein said equi-phase voltage generator system comprises a pulse multiplex transmitter system the unmodulated output channels of which constitute the phases.

8. A radio plan-position indicator system according to claim 1 in which the said period of application of said set of bearing voltages is less than said period of application of said position voltages, whereby the origin of each said trace is marked by a luminous spot on the trace, the positions of said spots indicating on the screen the positions of the direction finder stations which originate the respective traces, and wherein said commutative means comprises a polyphase sources of rectangular pulses having a plurality of separate groups of output phases, said groups corresponding to respective ones of said plurality of periods, each group including a plurality of successive phases, the pulse duration of each phase being equal to the pulse repetition period divided by the total number of phases, means responsive to some but not to all of the phases in a said group to control during the corresponding period the application of the said set of bearing-voltages to said first set of beam deflecting means, and means responsive to all the phases in a said group to control during the corresponding period the application of the said set of position-voltages to said second set of beam deflecting means, each said responsive means being operative for a period of substantially the same duration as the train of phases to which it responds.

9. A radio plan-position indicating system according to claim 8, wherein said first set of beam-deflecting means comprises four electrostatically beam-deflecting plates arranged round the beam in opposing parallel pairs the planes of which are mutually perpendicular, and wherein each said set of bearing voltages comprises four unidirectional voltages all of like polarity corresponding to respective ones of said beam-deflecting plates, the means to apply each said bearing voltage to said corresponding deflecting plate comprising a resistor through which said bearing voltage charges a condenser, a first rectifier through which the potential across said condenser is applied to said deflecting plate, a second rectifier in parallel with and normally short-circuiting the charging of said condenser and means to apply the said phases of a group of phases of said polyphase pulse source to block said second rectifier thereby removing the said short-circuit during the interval when said bearing voltage is to be applied to said beam deflecting plate.

10. A radio plan-position indicator system according to claim 9, wherein said second set of beam deflecting means comprises four magnetically beam-deflecting coils arranged round the beam in coaxial opposing pairs, the magnetic axes of said pairs being perpendicular to each other and to the axis of the beam, and one coil of each pair being energised from a direct current source, and wherein the means for generating each said set of position-voltages comprises two potentiometers, means for energising both said potentiometers by all the phases of the said group of phases corresponding to the operative period, means for deriving from said potentiometer two unidirectional rectangular-pulse position-voltages, and means for applying said two derived position-voltages to energise respectively the two otherwise unenergised said beam deflecting coils in such sense to oppose the coils energised from said direct current source.

11. A radio plan-position indicating system according to claim 10, in which the said means for applying the said two derived voltages comprises stages of direct current amplification.

12. A radio plan-position indicating system according to claim 11, in which said stages of direct current amplification are of the cathode-follower type.

CHARLES WILLIAM EARP.
RONALD MONTAGUE GODFREY.

REFERENCES CITED

The following references are of record in the file of this patent:

UNITED STATES PATENTS

| Number | Name | Date |
| --- | --- | --- |
| 2,183,634 | Zworykin | Dec. 19, 1939 |
| 2,399,671 | Gage | May 7, 1946 |